United States Patent
Roussey

(10) Patent No.: US 11,261,950 B2
(45) Date of Patent: Mar. 1, 2022

(54) FORCE-SHUNTING DEVICE AND MECHANICAL ACTUATOR COMPRISING SUCH A DEVICE

(71) Applicant: LORD Solutions France, Pont de l'Isere (FR)

(72) Inventor: Bastien Roussey, Tain l'Hermitage (FR)

(73) Assignee: Lord Corporation, Cary, NC (US)

( * ) Notice: Subject to any disclaimer, the term of this patent is extended or adjusted under 35 U.S.C. 154(b) by 569 days.

(21) Appl. No.: 15/695,022

(22) Filed: Sep. 5, 2017

(65) Prior Publication Data
US 2018/0066738 A1    Mar. 8, 2018

(30) Foreign Application Priority Data

Sep. 8, 2016   (FR) ...................................... 1658353

(51) Int. Cl.
*B64C 13/32*       (2006.01)
*B64C 13/28*       (2006.01)
(Continued)

(52) U.S. Cl.
CPC ......... *F16H 25/2021* (2013.01); *B64C 13/28* (2013.01); *B64C 13/30* (2013.01);
(Continued)

(58) Field of Classification Search
CPC ...... B66F 3/24; B66F 3/30; B66F 3/32; B66F 13/00; B66F 17/00; B64C 13/28; B64C 25/20; B64C 25/42; B64C 25/44; B64C 25/58; B64C 25/60; B64C 25/62; B64C 13/36; B64C 13/40; B64C 13/48; B64C 25/22; F16F 9/516; F16F 2222/04; F16F 7/09; B60G 13/02
(Continued)

(56) References Cited

U.S. PATENT DOCUMENTS 7,147,216 B2 * 12/2006 Gassner .................... E05F 5/02
                                                          267/201

FOREIGN PATENT DOCUMENTS

DE         203 13 920 U1    1/2005
DE     102007023303 A1 *   11/2008  ............ F15B 15/227
(Continued)

OTHER PUBLICATIONS

English translation of DE102007023303 (Year: 2008).*
French Patent Application 16 58353, Rapport de Recherche Préliminaire, May 9, 2017, 2 pages.

*Primary Examiner* — Tyrone V Hall, Jr.
*Assistant Examiner* — Abbie E Quann
(74) *Attorney, Agent, or Firm* — Lord Corporation

(57) ABSTRACT

A force-shunting device including a tube defining a main axis and an inner wall, a first member sliding within the tube, a primary leg arranged obliquely, attached to the first member and including a primary pad in frictional contact with the inner wall, such that, when an external force is applied in a first direction on the first member, the primary leg rubs, or grips by mechanical camming, against the inner wall, the tube thus reacting all or part of the external force, the device including a second member mounted within the tube, sliding along the main axis and securely provided with a driving element of the primary pad so as to reduce the friction on the inner wall, to unprime the rubbing or mechanical camming.

9 Claims, 6 Drawing Sheets

(51) Int. Cl.
*B64C 25/20* (2006.01)
*F16H 25/20* (2006.01)
*B64C 13/30* (2006.01)
*F16H 35/10* (2006.01)
*F16D 67/00* (2006.01)
*F16H 25/24* (2006.01)
*F16D 127/00* (2012.01)
*F16H 35/00* (2006.01)
*F16D 51/00* (2006.01)
*F16D 63/00* (2006.01)

(52) U.S. Cl.
CPC .............. *B64C 13/32* (2013.01); *B64C 25/20* (2013.01); *F16H 35/10* (2013.01); *F16D 51/00* (2013.01); *F16D 63/008* (2013.01); *F16D 2127/004* (2013.01); *F16H 25/2454* (2013.01); *F16H 2025/204* (2013.01); *F16H 2035/005* (2013.01)

(58) Field of Classification Search
USPC ................................................ 188/217, 281
See application file for complete search history.

(56) References Cited

FOREIGN PATENT DOCUMENTS

| | | | |
|---|---|---|---|
| FR | 2 896 300 A1 | 7/2007 | |
| FR | 3 017 600 A1 | 8/2015 | |
| GB | 297172 A | * 9/1928 | ................ B66F 3/30 |

\* cited by examiner

FORCE-SHUNTING DEVICE AND MECHANICAL ACTUATOR COMPRISING SUCH A DEVICE

CROSS REFERENCE TO RELATED APPLICATIONS

This application claims priority under 35 USC § 119 of French Patent Application No. 16 58353 filed on Sep. 8, 2016.

FIELD OF THE INVENTION

The present invention relates to a force-shunting device, as well as a mechanical actuator comprising such a device.

The invention relates to the general field of axial mechanical actuators, and in particular when they are implemented in the aeronautics field. On many aircraft, of the airplane or helicopter type, different types of axial mechanical actuators are installed making it possible to command the position or the orientation of various mechanical devices, for example aerodynamic flight surfaces, or retractable landing gear. In some cases, in particular in the case of a landing gear mechanism, it is necessary to provide means for locking the actuators in a specific position. Indeed, the forces supplied by the axial actuator during the deployment or retraction of the landing gear are lower than the forces that the landing gear must face once deployed, in particular at the moment of landing, or simply to bear the weight of the aircraft.

BACKGROUND OF THE INVENTION

The known locking means for axial mechanical actuators must be controlled or steered by an electrical or electromechanical control circuit, in order to block the axial actuator mechanically, on demand, when it is stopped or in a particular position. The implementation of such a steered device requires the installation, configuration and upkeep of steering means, which represents a certain cost and is a source of potential failures.

Theoretically, it would alternatively be possible to provide an axial mechanical actuator able to withstand high forces, and in particular to withstand all outside forces that may be applied on the mechanical actuator, when the latter is in motion or stopped. However, in this case it would be necessary to provide an "oversized" actuator, which, to withstand such outside forces, has a high cost, mass and energy consumption, which is not desirable for aircraft equipment.

SUMMARY OF THE DESCRIPTION

The aim of the invention is consequently to propose a new force-shunting device and a new mechanical actuator comprising such a device, which makes it possible to obtain, reliably and cost-effectively, a limitation or blocking of the forces that are applied on the mechanical actuator, without using means for steering this limitation or blockage.

To that end, the invention relates to a force-shunting device, comprising:
  a tube that extends along a main axis and that has a substantially cylindrical inner friction wall,
  a first member that is mounted sliding within the tube along the main axis,
  at least one primary leg arranged obliquely relative to the main axis, and including an inner end via which it is attached to the first member, and an outer end forming a primary pad, which is in frictional contact with the inner wall, the inner end being arranged upstream from the primary pad considering a first direction parallel to the main axis, such that, when a first external force is applied along a first direction on the first member, the primary leg rubs or grips by mechanical camming against the inner wall via its primary pad, the tube thus reacting only a fraction of the first external force by rubbing of the primary pad against the inner wall, or all of the first external force by mechanical camming of the primary leg, and
  a second member that is mounted within the tube, sliding along the main axis, and that is drivingly connected to the first member, and that is securely provided with at least one driving element, to drive the primary pad so as to reduce the friction of the latter on the inner wall, under the application of the first external force on the second member along a first direction, to unprime the rubbing or mechanical camming of the primary leg.

One of the ideas at the base of the invention is to provide coupling the force-shunting device, on the one hand to a jack via the second member, on the other hand to a mechanical action receiver, for example landing gear, coupled to the first member, in order to protect the jack from any forces with high values, which could be applied on the mechanical action receiver. To that end, when the mechanical action receiver receives the first external force, and transmits it to the first member, the device distributes the force received at the first member between the second member connected to the actuator, on the one hand, and the tube, on the other hand, which is for example connected to a second mechanical action receiver whose force resistance is higher than that of the jack. Thus, in particular the case where the first force is particularly high, the device transfers all or some of the first external force onto the tube rather than onto the second member, in order to protect the jack. The device according to the invention is designed such that this force shunting toward the tube is done automatically, mechanically and systematically, by gripping of the pad, obtained by mechanical camming of the primary leg, or rubbing of the primary leg against the tube. Lastly, the design of the device is such that the jack can freely exert a force on the first member, and therefore on the mechanical force receiver, via the second member. Indeed, the device uses a second external force applied by the motor to reduce the rubbing of the primary leg on the tube.

Of course, it is possible to integrate the force-shunting device into any mechanical system: in particular, the force-shunting device is not necessarily coupled to a jack and a mechanical action receiver. To use the force-shunting device, the presence of the jack, the mechanical action receiver, or more generally a mechanical system outside the force-shunting device, is preferable and therefore optional. The force-shunting device may also be applicable in ways other than those mentioned in the present document, in particular applications not related to the aeronautics field.

In this way, a mechanical actuator equipped with such a device is simultaneously reliable, inexpensive, compact and safe, the device in particular not being subject to electromechanical failures.

According to advantageous features of the device according to the invention, considered alone or according to any technically possible combination(s):
  the driving element is designed to tend to drive, or to drive, the primary pad away from the inner wall when the second external force is applied on the second member.

the second member forms a ring coaxial with the main axis, the driving element forming a pad that extends substantially parallel to the main axis, and via which the ring is attached to the primary leg.

the driving element is designed to bear against the primary leg in the first direction.

the first member forms a hollow cylinder that is coaxial with the main axis, the second member being translatable along the main axis within the hollow cylinder, the latter being provided with two stops defining a translational travel of the second member relative to the first member, and via which the second member can translate the first member along the main axis relative to the tube.

the primary leg is elastically deformable and is mounted so as to be able to keep the primary pad in contact with the inner wall by elasticity.

the inner end of the primary leg comprises an elastic pivot link by which it is attached with the first member, around a pivot axis that is substantially orthoradial to the main axis, the elastic pivot link making it possible to keep the primary pad in contact with the inner wall by elasticity.

at least two primary legs are distributed around the main axis.

the device comprises at least one secondary leg arranged obliquely relative to the main axis, the secondary leg including an inner end via which it is attached to the first member, and an outer end forming a secondary pad, which is in frictional contact with the inner wall, the inner end being arranged downstream from the secondary pad considering the first direction, such that, when a third external force is applied in opposition with the first direction on the first member, the secondary leg rubs or grips by mechanical camming against the inner wall via its secondary pad, the tube thus reacting only a fraction of the third external force by rubbing of the secondary pad of the secondary leg against the inner wall, or all of the third external force by mechanical camming of the secondary leg, the second member including a secondary driving element that is secured with the second member, to drive the secondary pad so as to reduce the friction of the latter on the inner wall, under the application of the fourth external force on the second member along a direction opposite the first direction, to unprime the rubbing or mechanical camming of the secondary leg.

The invention also relates to a mechanical actuator comprising a force-shunting device as defined above, and a jack coupled to the second member so as to be able to drive the latter along the main axis relative to the tube.

BRIEF DESCRIPTION OF THE DRAWINGS

The invention will be better understood upon reading the following description, provided solely as a non-limiting and non-exhaustive example and done in reference to the drawings, in which.

DETAILED DESCRIPTION

Figure 1:
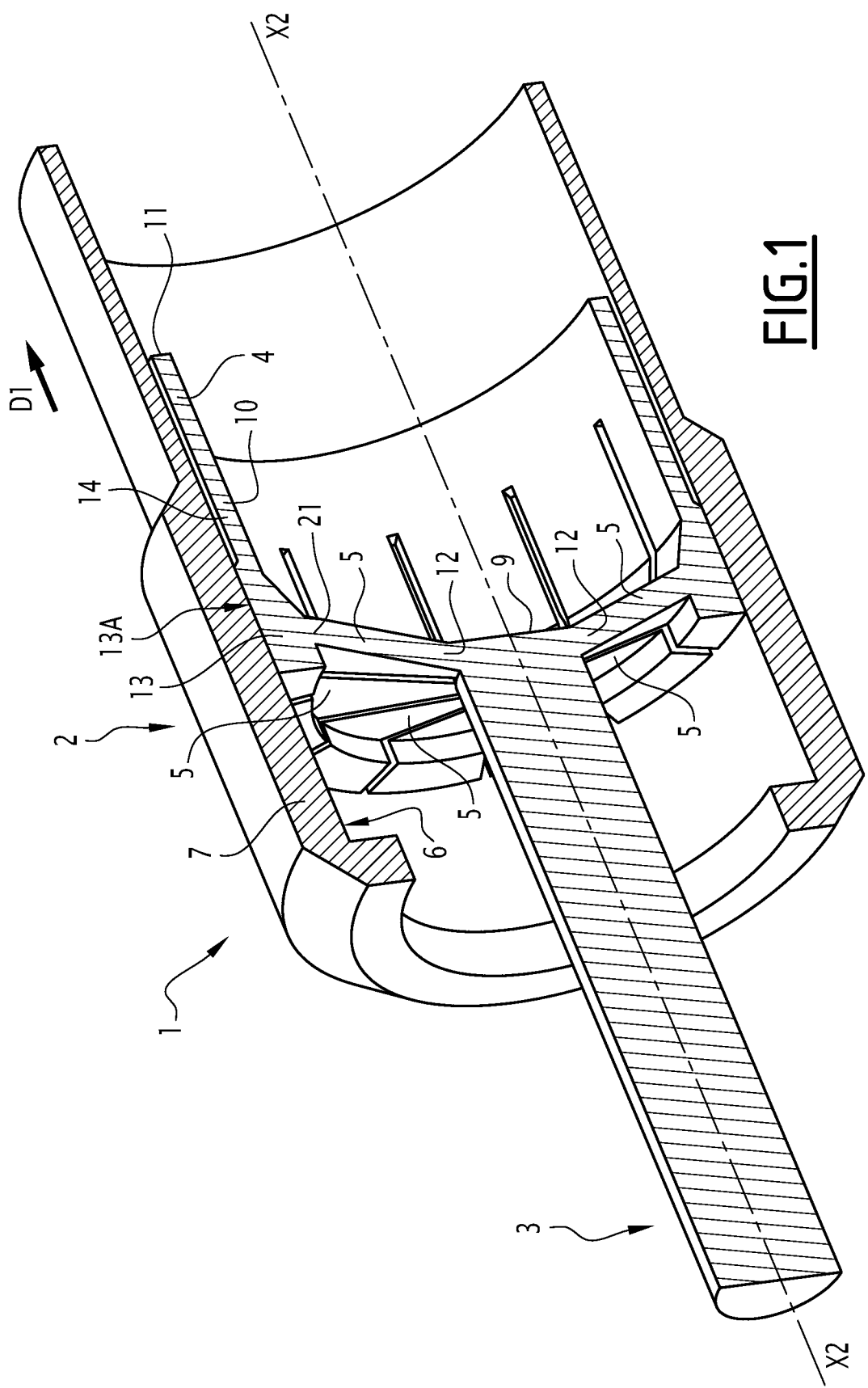
FIG. 1 is a perspective longitudinal sectional view of a force-shunting device according to a first embodiment of the invention.

FIG. 1 shows a force-shunting device 1 that comprises a tube 2, a first member 3, a second member 4 and a plurality of primary legs 5. The example embodiment of FIG. 1 will be taken in the context of an aircraft, and more specifically in the case where the device 1 is implemented in a mechanism for deploying and retracting the landing gear of the aircraft.

The tube 2 extends along a main axis X2, which preferably forms its axis of revolution. The tube 2 thus for example forms an annular sleeve, the axis of which is coaxial to the main axis X2. The tube 2 has an inner wall 6, which in turn is preferably cylindrical and coaxial to the main axis X2, but which may also have a prismatic or frustoconical shape. The inner wall 6 forms a friction wall and is therefore formed by a friction-resistant material, for example a metal material. The tube 2 has a general construction that allows the inner wall 6 to withstand frictional forces, and radial forces relative to the main axis X2. To that end, the tube 2 advantageously comprises a wall stiffener 7, i.e., a local overthickness of the wall of the tube 2, so that the inner wall 6 withstands any radial forces applied against it.

The tube 2 advantageously forms the casing of the device 1, via which the device 1 will be mounted within a mechanical system, and in particular within a mechanical actuator including the device 1 and a jack, not shown in the figures, coupled thereto. In the case of the aforementioned aircraft, the tube 2 may be connected securely to the chassis of the aircraft, or at least to a support on which an actuator of the landing gear is in turn mounted, this actuator for example being formed by a jack. According to the configuration shown in the figures, the device 1 is integrated into the jack, the tube 2 then forming the casing of the jack. Preferably, the jack comprises an axial spindle motor, which is not illustrated for simplification reasons, and a means, not illustrated, for converting the rotary movement of the axis of the motor into a translational movement, for example a screw-nut system.

The first member 3 extends along the main axis X2, and includes a first coupling end 8, the latter being arranged upstream from the second end 9 considering the direction D1 shown in FIG. 1, the direction D1 being defined parallel to the main axis X2.

Figure 2:
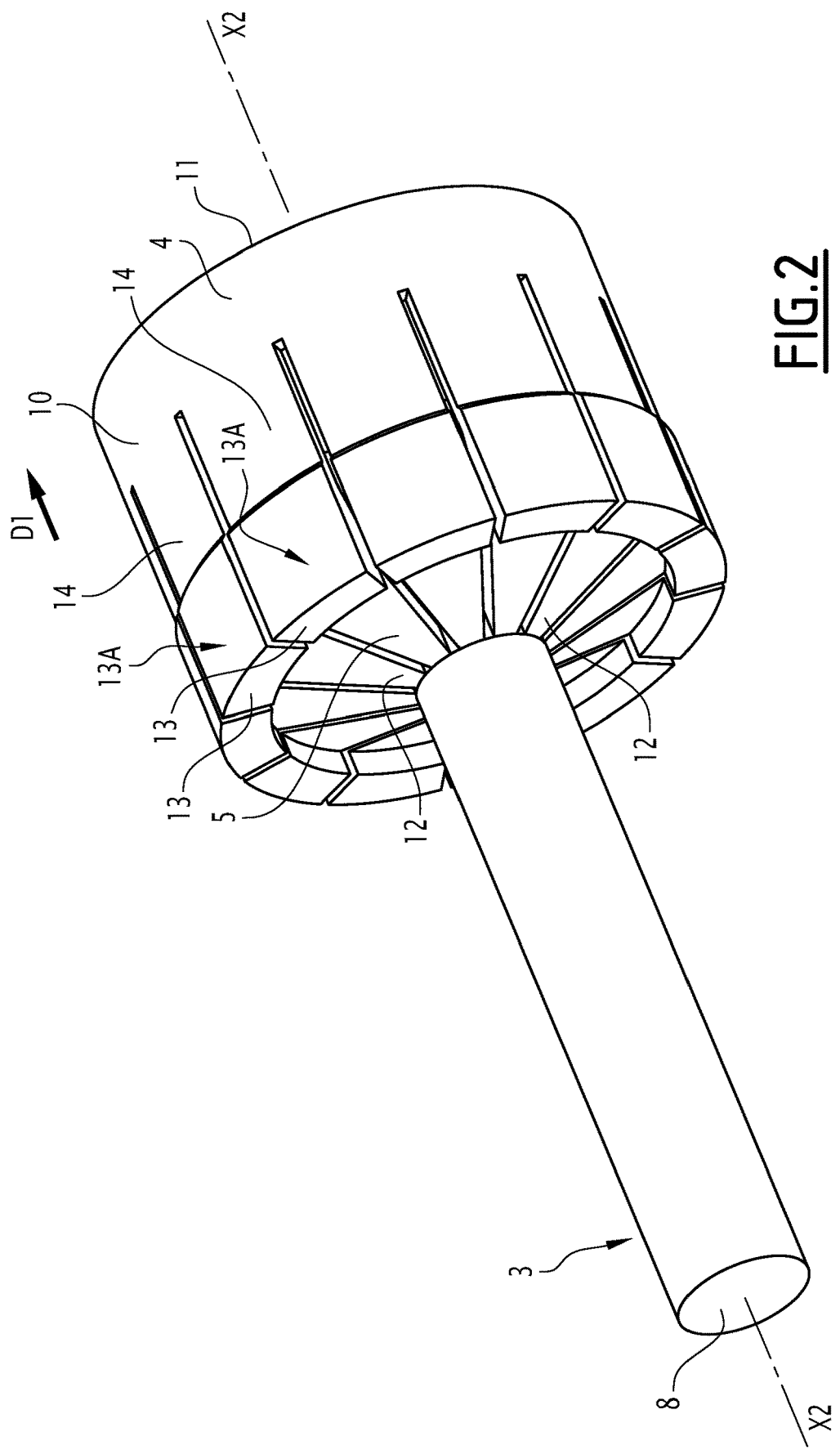
FIG. 2 is a perspective view, from the same angle as FIG. 1, of only part of the device according to FIG. 1.

As illustrated in FIGS. 1 and 2, the first member 3 preferably forms a rod, which is for example made from metal, and which is designed to withstand traction and compression forces along the main axis X2. In practice, this rod forms the rod of the cylinder. The rod is coaxial with the main axis X2. As an alternative to a rod, the first member 3 may form a hollow cylinder or an extruded shape along the main axis X2.

In practice, the first member 3 is designed to be coupled to a force receiver, not shown in the figures, and that will be intended to receive forces from the jack via the device 1. In the example scenario of the aforementioned aircraft, the force receiver may form the landing gear of the aircraft.

The second member 4 of the device 1 is shown in FIG. 1 and FIG. 2, in which it is particularly visible. The second member 4 preferably forms a ring coaxial with the main axis X2 and the diameter of which is larger than that of the rod forming the first member 3. The second member 4 thus advantageously has an annular shape, and includes a circular first end 10, as well as a second coupling end 11, also circular, between which the second member 4 extends.

In practice, the second member 4 is intended to be coupled with the aforementioned jack, in particular via the second coupling end 11. In practice, the second coupling end 11 is directly connected to the aforementioned movement conversion means of the jack, and in particular to the nut of the aforementioned screw-nut system. The jack thus coupled to the second member 4 can drive the latter along the main axis X2 in a translational movement. In the first direction D1, and also opposite the first direction D1. In the example of the aforementioned aircraft, the jack thus coupled to the second member 4 makes it possible to drive the landing gear, which in turn is connected to the first member 3. The second member 4 been designed to be coupled to the jack, it is preferably made from a material able to withstand traction and compression forces along the main axis X2 in particular coming from the jack, and is for example made from a metal.

It will be understood that the shape of the first coupling end 8 as well as that of the second coupling end 11 can be adapted or extended relative to the shapes shown in FIGS. 1 and 2 based on the reciprocal coupling means of the force receiver, formed in particular by the landing gear, and the aforementioned jack, respectively.

Each primary leg 5 of the device 1 is arranged obliquely relative to the main axis X2 and includes an inner end 12 and an outer end forming a primary pad 13. The inner end 12 is arranged upstream from the primary pad 13 considering the direction D1, such that the primary leg 5 forms an obtuse angle with the main axis X2. As described below, the primary pad 13 bears against the inner wall 6 according to an oblique force O1 shown in FIG. 3, such that the pad 13 and the leg 5 are designed so that the point of intersection between axis coaxial to the oblique force O1 and the inner wall 6 is arranged downstream from the inner end 12. It is thus approximately the outer end of the leg 5 that is downstream from the inner end 12. The primary leg 5 topped by the primary pad 13 is advantageously in the shape of a hammer, the primary pad 13 extending parallel to the main axis X2 on either side of the body of this primary leg 5. Shapes other than the aforementioned hammer shape can be considered, in particular based on the distribution of the forces applied on the primary pad 13.

The primary pad 13 is provided, on its side turned away from the main axis X2, with a friction surface 13A provided to be translated and rubbed in translation along the main axis X2. In practice, the friction surface 13A of the primary pad 13 forms a cylinder or cone portion coaxial with the main axis X2, and the geometric center of gravity of which is centered on the point of intersection between the axis coaxial to the oblique force O1, described below, and the inner wall 6.

Each primary leg 5 is elastically deformable, preferably at least at its inner end 12, or even at the base 21 of the pad 13. This property can for example be obtained by designing the primary leg 5 with a geometry favorable to its elastic deformation, in particular at the inner end 12 and/or the base 21, in the case at hand depending on whether the primary leg 5 has a smaller thickness at the inner end 12 and/or at the base 21. According to this configuration, the primary leg 5 can be made from a metal material that can deform elastically, while being strong and durable. The elastically deformable nature of the primary leg 5 allows it to have a tendency toward elastic flexion when the primary pad 13 is subject to friction forces oriented parallel to the main axis X2. In the presence of such friction forces, the primary leg 5 tends to move away from its initial configuration, or at least to modify the radial force applied via the primary pad 13 on the inner wall 6, and is designed to return by elasticity to this initial configuration, in the absence of friction forces, and thus to reestablish the radial force initially applied. In practice, the primary pad 13 is designed to remain in contact with the inner wall 6, with a more or less high friction based on the application of the axial forces on the first member 3 and the second member 4, the primary leg 5 being designed to convert part of these axial forces into radial forces applied on the primary pad 13, through the flexibility of the primary legs 5.

Although the device is shown in FIGS. 1 and 2 with twelve primary legs 5, it may nevertheless include more primary legs, or a smaller number of primary legs, for example two primary legs. In the case where the device 1 is provided with a plurality of primary legs 5, the latter are distributed around the main axis X2, regularly, and jointly form a flexible skirt, the outer periphery of which is formed by the series of primary pads 13, as shown in FIG. 2. This arrangement of the primary pad 13 leads the friction surfaces 13A of the latter to jointly form a cylindrical friction enclosure. The inner part of the aforementioned skirt is in turn formed by a circular arrangement of the inner ends 12 of the primary legs 5. Preferably, the inner ends 12 are situated at the same height along the main axis X2. Likewise, the primary pads 13 are situated at the same height along the main axis X2.

The first member 3 is mounted sliding within the tube 2 along the main axis X2. In this way, the first member 3 can be translated relative to the tube 2 along the main axis X2. The fourth receiver, which is for example formed by the landing gear, is thus intended to receive traction or thrust forces from the first member 3, these forces being applied relative to the tube 2, which forms a mechanical frame of reference. The primary legs 5 are attached to the first member 3 by their inner end 12, at the second end 9 of the first member 3. The rod forming the first member 3 is thus extended by the aforementioned skirt along the main axis X2, the plurality of primary legs 5 forming a cone coaxial with the main axis X2, the apex of which is formed by the second end 9 of the first member 3, the cone developing in the direction D1.

The primary pads 13, as shown in FIG. 1, are in contact, by their surface 13A, with the inner wall 6 of the tube 2. Thus, when the first member 3 slides along the main axis X2 and relative to the tube 2, the fiction surfaces 13A of the pads 13 rub or adhere on the inner wall 6. The contact in question is therefore a so-called "frictional" contact.

The friction forces being applied tangentially on the primary pad 13, they tend to rotate the primary leg 5 around its inner end 12, which results in:
   tightening the contact between the primary pad 13 and the inner wall 6 when the frictional force is oriented away from the first direction D1,
   loosening the contact between the primary pad 13 and the inner wall 6 when the frictional force is oriented along from the first direction D1.

It will be understood that the primary leg 5 does not, in practice, rotate around its inner end 12, but simply applies a more or less significant force on the primary pad 13 based on tangential friction forces exerted on the latter. The elastically deformable nature of the primary legs 5 makes it possible to keep the primary legs 13 in frictional contact with the inner wall 6 by elasticity of the primary legs 5. Indeed, the primary legs are advantageously mounted such that the tube 2 exerts slight pressure on the primary pads 13 and so as to impose a slight elastic deformation on the primary legs 5, the latter thus applying, in response, pressure on the inner wall 6 via the primary pads 13, such that the contact between the primary pads 13 and the inner wall 6 is maintained. It will be understood that if one considers the first member 3 in a configuration where it is separated from the tube 2 as illustrated in FIG. 2, the distance that separates the axis X2 from the surface 13A, measured radially relative to the axis X2, is greater than the distance separating the same elements and measured relative to the same axis when the first member 3 is in a configuration where it is mounted within the tube 2, as illustrated in FIG. 1.

The second member 4 is mounted sliding within the tube 2 along the main axis X2. The second member 4, shown in FIGS. 1 and 2, is drivingly connected to the first member 3. In the example shown in FIGS. 1 and 2, the second member 4 is securely provided with pads 14, which are also each connected to one of the primary legs 5. Each pad 14 preferably extends in the extension of the primary pad 13 and forms a hollow cylindrical portion coaxial with the main axis X2. Each pad 14 is slightly inwardly withdrawn, i.e., toward the main axis X2, relative to the primary pad 13, such that the friction surface 13A of the primary pad 13 protrudes slightly relative to the pad 14.

In practice, the pads 14 form elements driving the primary pad 13 via the second member 4. Thus, the latter is connected to the first member 3 by the primary legs 5 and the pads 14. In other words, the connection between the first member 3 and the second member 4 is ensured by the aforementioned skirt. The jack coupled to the second member 4 can thus translate the first member 3 along the main axis X2 relative to the tube 2, which forms the mechanical frame of reference.

The second member 4, forming a ring, is advantageously in the extension of the pads 14 so as not to come into contact with the inner wall 6. The second member 4 connects the primary legs 5 to one another, via their respective pad 13.

Figure 3:
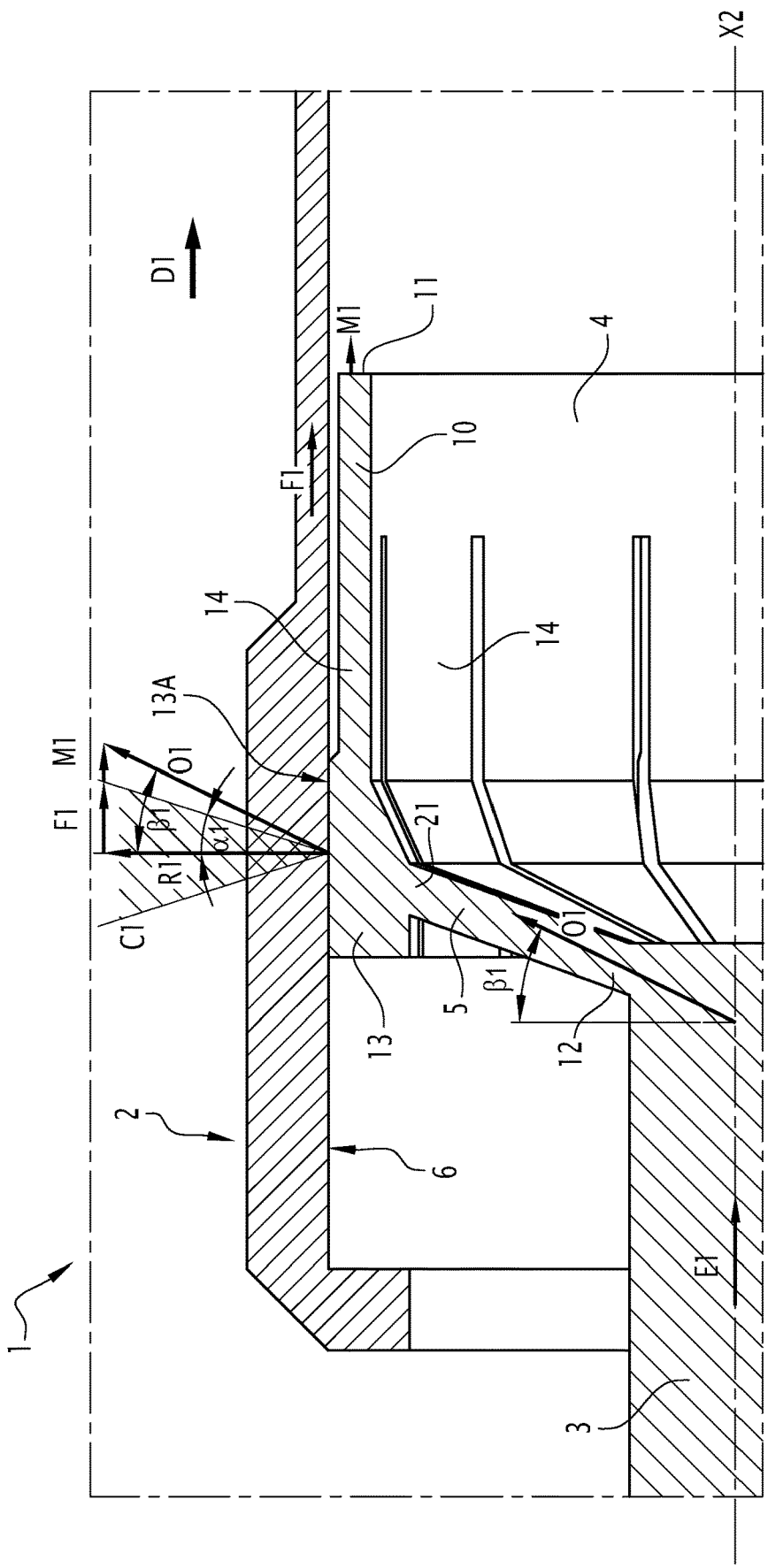
FIGS. 3 and 4 are partial longitudinal sectional views of the device of FIG. 1, respectively showing different force application situations.
Figure 4:
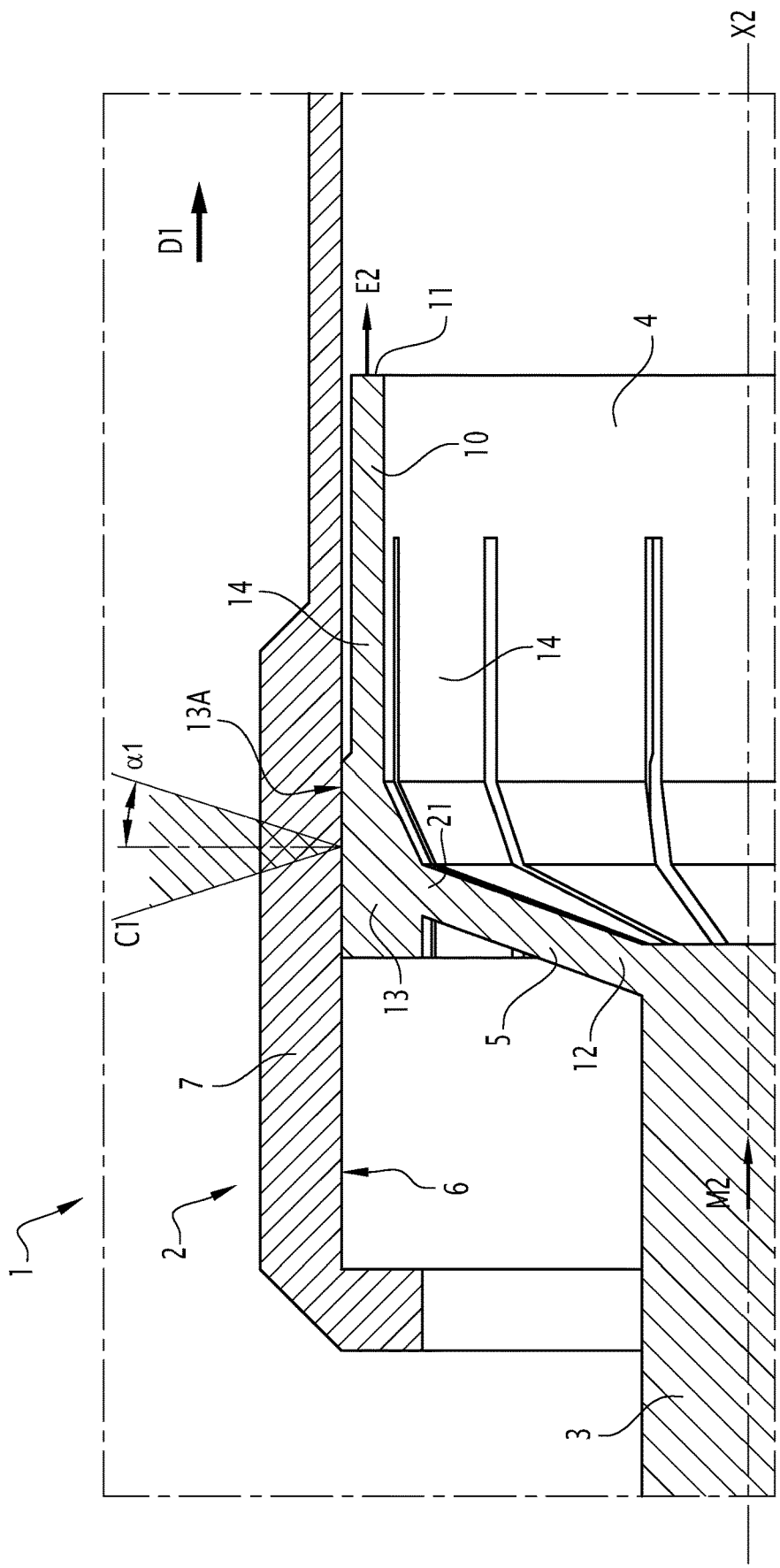

When a first external force E1, shown in FIG. 3, is applied along a first direction D1 on the first member 3, for example via the first coupling end 8, the primary legs 5 begin to rub against the inner wall 6 via the primary pads 13 against the inner wall 6, but without gripping. This friction results in rubbing of the primary pads 13 along the inner wall 6, the first member 3 being in motion relative to the tube 2 along the direction D1. It is possible to determine, by calculation, a friction cone C1 of the pad 13 on the inner wall 6, the cone C1 having an angle α1, as illustrated in FIGS. 3 and 4. It is possible to demonstrate, by calculation, that the value of the angle α1 of this friction cone C1 depends on the geometry of the first member 3, and in particular the legs 5, as well as the friction coefficient of the pad 13 against the inner wall 6. It is also possible to demonstrate, by calculation, that the value of the angle α1 does not depend, or depends little, on the value of the external forces applied on the first member 3 or the second member 4, and in particular does not depend on the force E1 applied on the first member 3. This calculation is not outlined here, inasmuch as it can be done based on general mechanical knowledge, or using specialized software.

The device 1 is thus designed with a geometry, a state of the surface 13A and the wall 6, as well as materials, whose characteristics make it possible to define the value of the angle α1 of the cone C1 to obtain the following operation.

As shown in FIG. 3, the first external force E1 is transmitted to the primary pad 13 by the primary leg 5 in the form of a first oblique force O1, which is oriented along the primary leg 5, parallel to the latter, or at least practically parallel. The device 1, and in particular the legs 5, are designed so that the force O1 forms an angle β1, the value of which is greater than that of the angle α1, relative to a direction centrifugal to the axis X2, i.e., it extends geometrically outside the cone C1, such that the member 3 slides within the tube 2 along the direction D1. In this operation, the tube 2 reacts only a fraction F1 of the first external force E1 by rubbing of the primary pads 13 against the inner wall 6, which is shown in FIG. 3. Another fraction M1 of the force E1 is transmitted to the second member 4, and in particular to the coupling end 11. The sum of fractions M1 and F1 is substantially equal to the value of the force E1.

This oblique force O1 has an axial component along the main axis X2 that is reflected by a friction force of the primary pad 13 on the inner wall 6, this friction force forming the fraction F1 of the first external force E1 reacted by the tube 2. The first oblique force O1 also breaks down into a first radial component R1 that is reflected by bearing along a centrifugal direction of the primary pad 13 against the inner wall 6. It will be understood that the presence of this first radial component R1 is related to the oblique geometry of the primary leg 5 and its ability to deform elastically so as to bend in a direction opposite the first direction D1, which makes it possible to grip the primary pad 13 against the inner wall 6, such that the primary leg 5 tends to mechanically cam, but without reaching a mechanical camming configuration.

Thus, the value of the difference between the angles β1 and α1 determines the value of the fraction F1 relative to that of the fraction M1. Advantageously, the device 1 is designed so that the angle β1 is greater than the angle α1 while being very close to the latter, for example so that β1 measures one degree more than α1, such that the value of the fraction F1 is much higher than the value of the fraction M1. Alternatively, it is for example possible to provide that the angle α1 is equal to half the angle α1, such that the fraction F1 is equal to the value of the fraction M1.

It will be understood that a fraction M1 of the value of the first external force E1 that is not reacted by the tube 2 at the inner wall 6 is transmitted to the second member 4, in particular via the pads 14. Consequently, only the fraction M1 of the first external force E1 is transmitted to the second member 4, and therefore to the jack to which the latter is coupled. The jack is thus protected from the forces coming from the force receiver. Furthermore, when these forces are particularly substantial, all or some of these forces are reacted by the tube 2. In the case of the aforementioned aircraft example, the forces oriented along the first direction D1 are distributed between the jack and the chassis of the device, with which the tube 2 is secured.

Preferably, the device 1 is designed and sized such that, when it is used, the primary legs 5 do not cam, i.e., such that the angle β1 is greater than the angle α1, in order to avoid blocking of the device 1. Nevertheless, their tendency to mechanically cam allows the device 1 to transmit a majority, if not essential, fraction F1 of the external force E1 to the tube 2. Thus, during a normal use of the device 1, the primary legs 5 are designed so as, under the action of a predetermined maximum usage external force, oriented along D1 and applied on the first member 3, to be practically camming, in order to transmit a maximum fraction F1, practically equal to the value of the force E1, of this external force automatically to the tube 2 and to protect the jack, which nevertheless absorbs a remaining fraction M1 of the external force in question, which is then negligible.

In the situation illustrated in FIG. 4, a second external force E2 is applied on the second member 4, along the first direction D1, while the aforementioned force E1 is no longer applied. The force E2 is advantageously produced by the jack, not shown, which is coupled to the second member 4, and seeks to pull the force receiver, which is to say the landing gear, for example, which is coupled to the first member 3. It will be understood that the second external force E2 thus allows the second member 4 to drive the pads 14, which in turn drives the primary legs 5 via the primary pads 13. The pads thus form driving elements of the primary legs under the action of the second external force E2.

The driving elements formed by the pads 14 then make it possible, owing to a flexion or rotation tendency of the primary legs 5 around their respective inner end 12 in the direction D1, to slightly loosen the contact between the primary pads 13 and the inner wall 6, so as to reduce the contact pressure, and therefore the friction between these elements. By driving the primary pads 13 along the first direction D1, the second member 4 thus tends to drive the primary pads 13 away from the inner wall 6, preferably without, however, breaking the contact between the latter.

In this situation, the primary pads 13 apply a centrifugal force relative to the axis X2 on the tube 2 which is negligible or zero, such that the tangential friction force applied on the surface 13A is in turn negligible or zero, or at least significantly lower than the value of the tangential friction force in the case of FIG. 3. Consequently, the application of the second external force E2 on the second member 4 goes against the tendency of the primary legs 5 to mechanically cam against the inner wall 6 by loosening of the pads 13, such that the friction of the primary legs 5 is unprimed. In practice, the application of the second external force E2 on the second member 4 makes it possible to contract the aforementioned skirt slightly, such that the primary pads 13 can slide in the first direction D1 along the inner wall 6, while remaining in sliding contact with the tube 2. Thus, a very small fraction of the second external force E2 is reacted by friction by the inner wall 6, such that a maximum fraction M2, or even practically all, of the second external force E2 is transmitted to the first member 3, and consequently the force receiver, which is advantageously formed by the landing gear if we consider the aforementioned example. In this situation, the friction between the primary pads 13 and the inner wall 6 is practically zero, or even nonexistent, and the value of the fraction M2 is equal to, or very slightly lower than, the value of the force E2. In this case, the member 3 is moved by the member 4 in the direction D1.

In a third case, not illustrated, where an external force is applied oriented in a direction opposite the direction D1, on the second member 4, and the aforementioned force E1 is not applied, it will be understood that the primary legs 5 have a geometry and an arrangement within the tube 2 that are not favorable to significant friction, or gripping, of the primary legs 5 against the inner wall 6, such that, similarly to the case of FIG. 4, the tangential friction force of the pads 13 against the inner wall 6 is negligible. In this third case, the friction is unprimed, and practically all of the aforementioned external force, opposite D1 and applied on the member 4, is transmitted to the member 3 via the legs 5. In this third case, the member 4 moves the member 3 in a direction opposite the direction D1 relative to the tube 2.

In a fourth case, not shown, where an external force is applied oriented in a direction opposite the direction D1, on the first member 3, and the aforementioned force E2 is not applied, it will be understood that the primary legs 5 have a geometry and an arrangement within the tube 2 that are not favorable to significant friction, or gripping, of the primary legs 5 against the inner wall 6, such that, similarly to the case of FIG. 4, the tangential friction force of the pads 13 against the inner wall 6 is negligible. In this fourth case, the friction is unprimed, and practically all of the aforementioned external force, opposite D1 and applied on the member 3, is transmitted to the member 4 via the legs 5. In this fourth case, the member 3 moves the member 4 in a direction opposite the direction D1 relative to the tube 2.

In light of the foregoing, the device 1 makes it possible, by strong friction, to reduce the forces applied in the first direction D1 on the first member 3, automatically, mechanically, and systematically, without needing any form of steering or control, for example electronic. The forces applied on the second member 4, for example by the jack, are in turn transmitted to the first member 3, the device 1 opposing little or no resistance to this transmission.

Figure 5:
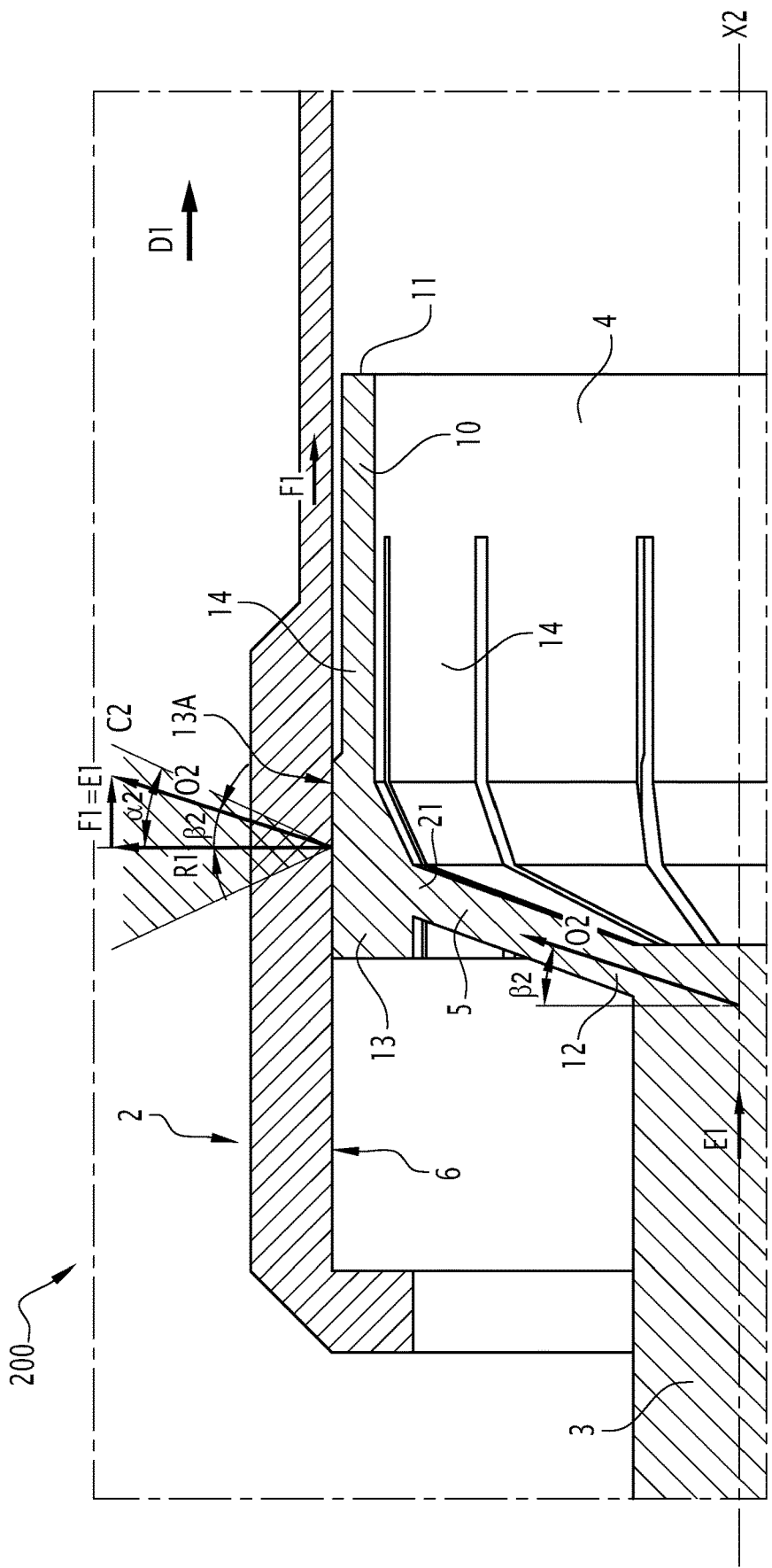
FIG. 5 is a partial longitudinal sectional view of a shunting device according to a second embodiment of the invention.

The continuation of the description relates to a second embodiment of the device 1, which is shown in FIG. 5, and which is referenced 200. In this FIG. 5, identical numbers are used to reference the elements that correspond to those of FIGS. 1 to 5 and described in the above. The force-shunting device 200 comprises the tube 2, a first member 3, a second member 4 and primary legs 5. Only the differences between the second embodiment and the first embodiment are described below.

This device 200 has an appearance very similar to the device 1 previously described, but differs from the latter in that it is designed to have a friction cone C2, instead and in place of a friction cone C1. The friction cone C2 corresponds to the rubbing of the pad 13 on the inner wall 6, and has an angle $\alpha2$ that is greater than the angle $\alpha1$ previously described. As in the case of FIGS. 1 to 4, it is possible to demonstrate by calculation that the value of the angle $\alpha1$ of this friction cone C2 depends on the geometry of the device 200, and in particular that of the first member 3, the legs 5, as well as the friction coefficient of the pad 13 against the inner wall 6. It is also possible to demonstrate, by calculation, that the value of the angle $\alpha1$ does not depend, or depends little, on the value of the external forces applied on the first member 3 or the second member 4, and in particular does not depend on the force E1 applied on the first member 3.

The device 200 is thus designed with a geometry, a state of the surface 13A and the wall 6, as well as materials, whose characteristics make it possible to define the value $\alpha2$ of the cone C2 to obtain the following operation.

As shown in FIG. 5, the first external force E1 is transmitted to the primary pad 13 by the primary leg 5 in the form of an oblique force O2, which is oriented along the primary leg 5, parallel to the latter, or at least practically parallel. The device 200, and in particular the legs 5, are designed so that the force O2 forms an angle $\beta2$, the value of which is greater than that of the angle $\alpha2$, relative to a direction centrifugal to the axis X2, i.e., the angle $\beta2$ extends geometrically outside the cone C2, such that the member 3 is blocked in translation by adherence against the tube 2 in the direction D1. In practice, the legs 5 are mechanically camming against the inner wall 6. In this operation, the tube 2 reacts only a fraction F1, the value of which is equal to the entire first external force E1, by gripping of the primary pads 13 against the inner wall 6, which is shown in FIG. 5. In this case, the force E1 is not transmitted to the second member 4, and in particular to the coupling end 11, but is fully reacted by the tube 2. The value of the force E1 is equal to the value of the tangential friction force of the surface 13A against the wall 6.

This oblique force O2 has an axial component along the main axis X2 that is reflected by a friction force of the primary pad 13 on the inner wall 6, this tangential friction force forming the fraction F1 of the first external force E1 reacted by the tube 2. In the case of this second alternative, the fraction F1 is equal to the force E1. The oblique force O2 also breaks down into a first radial component R1 that is reflected by bearing along a centrifugal direction of the primary pad 13 against the inner wall 6. It will be understood that the presence of this first radial component R1 is related to the oblique geometry of the primary leg 5 and its ability to deform elastically so as to bend in a direction opposite the first direction D1, which makes it possible to grip the primary pad 13 against the inner wall 6, such that the primary leg 5 is mechanically camming.

Irrespective of the value of the difference between the angles β2 and α2, all of the force E1 is reacted by the tube 2, such that the member 3 is blocked in the tube 2 and fastened relative to the latter.

It will be understood that the operation of the protection device 200 is the same as that of the device 1 of the first embodiment illustrated in FIGS. 1 to 4, in the following cases:
- an external force is applied in the direction D1 on the member 4, which drives the loosening of the pads 13 to reduce the friction of the latter against the wall 6, which unprimes the mechanical camming of the legs 5 and authorizes practically free movement of the members 3 and 4 in the direction D1;
- an external force is applied in opposition relative to the direction D1 on the member 4; and
- an external force is applied in opposition relative to the direction D1 on the member 3.

Thus, the device 200 transmits all of the external forces applied in the direction D1 on the first member 3 to the tube 2, without transmitting them to the second member 4, and does so automatically, mechanically, and systematically, without needing any form of steering or control, for example electronic. The external forces applied on the second member 4, for example by the jack, are in turn transmitted to the first member 3, the device 1 opposing little or no resistance to this transmission.

Figure 6:
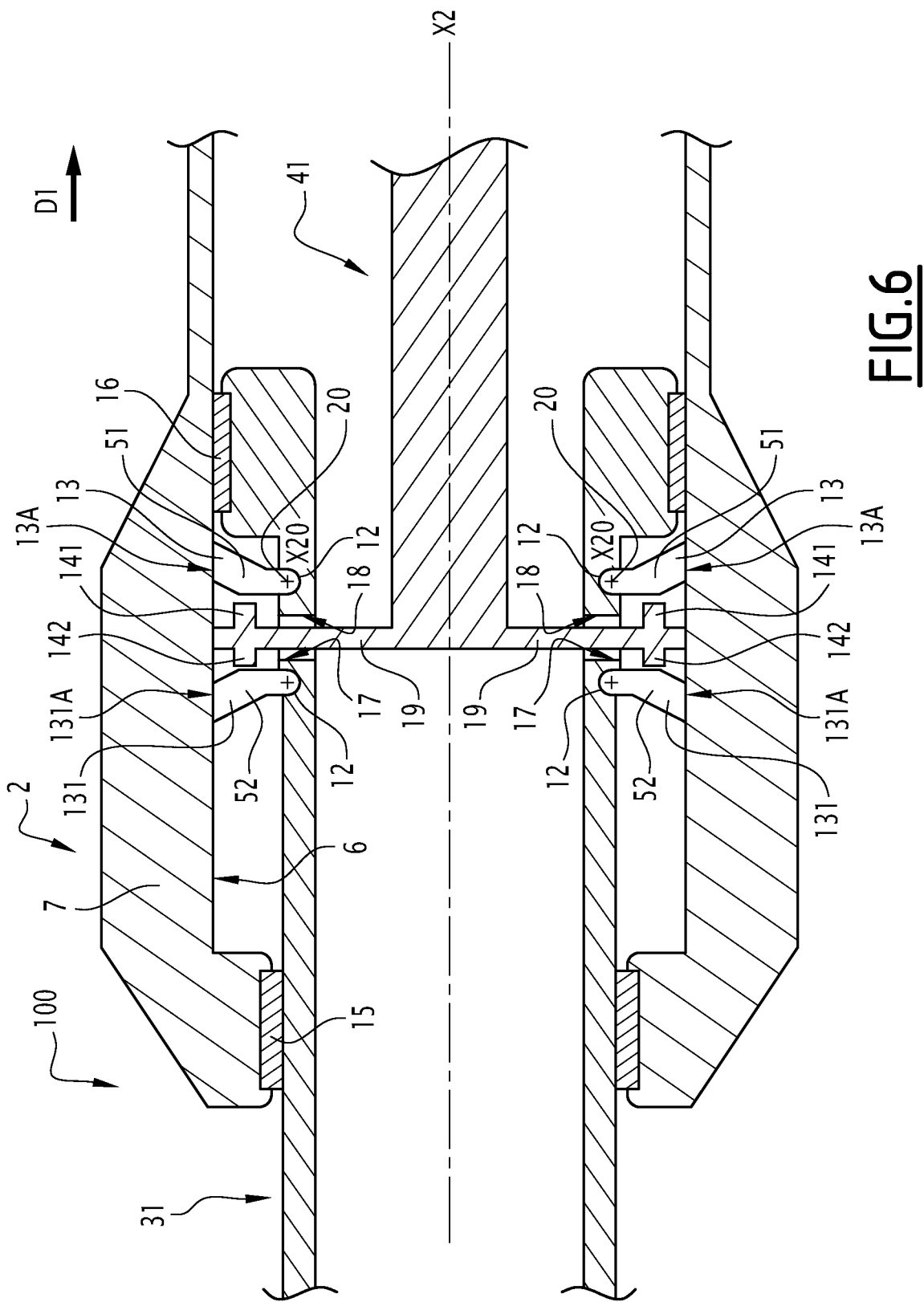
FIG. 6 is a longitudinal sectional view of a third embodiment of a device according to the invention.

The continuation of the description relates to a third embodiment of the device 1, which is shown in FIG. 6, and which is referenced 100. In this FIG. 5, identical numbers are used to reference the elements that correspond to those of FIGS. 1 to 5 and described in the above. The force-shunting device 100 comprises the tube 2, a first member 31, a second member 41 and primary legs 51. The features of this third embodiment may be combined with those of the first and second embodiments of FIGS. 1 to 5.

In the case of FIG. 6, the first member 31 forms a hollow cylinder that is coaxial with the main axis X2, and that is mounted sliding along the main axis X2 within the tube 2, for example via an upstream bearing 15 that makes it possible to guide the first member 31 over an intermediate part thereof. A downstream bearing 16, which is for example mounted at one end of the first member 31 within the tube 2, is for example in sliding contact, in translation parallel to the main axis X2, with the inner wall 6.

The second member 41, which, as illustrated in FIG. 6, forms a rod coaxial with the main axis X2, is translatable along the main axis X2 within the hollow cylinder. The latter is provided with stops, in the case at hand upstream stops 17 and downstream stops 18, which define a translational travel of the second member 41 relative to the first member 31 along the main axis X2. In the case at hand, the stops 17 and 18 are formed by the edges of two radial bores that are arranged in a diametrically opposite configuration in the wall of the hollow cylinder. The second member 41 in turn comprises two radial arms 19, which protrude radially from the rod 41 away from the main axis X2. The radial arms 19 traverse the radial bore so as each to be stopped, during the translation of the second member 41, by the stops 17 and 18. To that end, the edges of the bores forming the stops 17 and 18 are placed at a distance from one another along the main axis X2, the value of which exceeds the thickness of the radial arms 19, so as to allow translation of the latter parallel to the main axis X2 until coming into contact either with the stop 17 or with the stop 18, which then define the maximum travel of the radial arms 19, and therefore the second member 41. Consequently, the second member 41 can translate the first member 31 along the main axis X2 when the radial arms 19 abut against the stops 17 or against the stops 18. Of course, the first member 31 may also translate the second member 41 via the stops 17 and 18.

Each of the primary legs 51 comprises an elastic pivot link 20 by which each primary leg 51 is connected with the first member 31. The primary legs 51 are thus connected to the hollow cylinder outside the latter via elastic pivot links that are situated at their inner ends 12. Like for the example of FIGS. 1 to 5, the primary legs 51 are oriented obliquely between the hollow cylinder forming the first member 31 and the inner wall 6 of the tube 2 so as to be in contact at their primary pad 13 with said inner wall 6. The primary legs 51 are attached to the first member via an elastic pivot link 20 around a pivot axis X20 that is substantially orthoradial to the main axis X2, i.e., that is oriented along a geometric circle coaxial with the main axis X2. The elastic pivot link 20 of each primary leg 51 in practice makes it possible to maintain the contact between the primary pads 13 and the inner wall 6 by elasticity of the elastic pivot link 20, such that friction is exerted between the pads 13 and the inner wall 6. In this case, the elastic pivot link 20 performs a function comparable to that obtained owing to the frictionally elastically deformable nature of the primary leg 5 of the device 1 of FIGS. 1 to 5. The elastic nature of the pivot link 20 makes it possible to consider that the primary leg 51 is rigid.

FIG. 6 shows fingers 141, which each protrude from one of the radial arms 19. Each radial arm 19 is thus advantageously extended by one of the fingers 141 near its free end, and in particular the outside of the hollow cylinder forming the first member 31. Each finger 141 is thus secured to the second member 41 via its associated radial arm 19, and is designed to bear against one of the primary legs 51, in the main direction D1, when the second member is pulled in the direction D1 by the second external force E2. The fingers 141 thus form elements 141 driving the primary legs 51 away from the inner wall 6. According to this configuration, before the radial arms 19 come into contact with the downstream stops 18, the fingers 141 rotate, in the first direction D1, around the pivot axis X20, the primary legs 51 so as to break the contact between the pads 13 and the inner wall 6 and thus unprime the rubbing or mechanical camming of the primary legs 51. When a force contrary to the second external force E2 breaks the bearing of the fingers 141 on the primary legs 51, the latter return to their initial position owing to the elasticity of the elastic pivot link 20, such that the frictional contact between the primary pads 13 and the inner wall 6 is reestablished.

Under the application of the first external force E1, the second member 41 is made to abut against the upstream stop 17 such that the finger 141 does not bear against the primary leg 51, the latter then having a tendency to mechanically camming, like in the case of the first and second embodiments of FIGS. 1 to 4 and FIG. 5. The legs 51 and the inner wall 6 are designed so that:

under the application of the force E1, the legs 51 rub on the inner wall 6 without mechanically camming, and thus transmit only a fraction of the force E1 to the tube 2, and the remaining fraction of the force E1 to the second member 41, while allowing the movement of the members 31 and 41 in the direction D1, similarly to the embodiment of FIGS. 1 to 4, or alternatively, the legs 51 and the inner wall 6 are designed so that, under the application of force E1, the legs 51 grip by mechanical camming against the inner wall 6, such that any movement of the members 31 and 41 in the direction D1 is retained by the tube 2, similarly to the embodiment of FIG. 5.

The device 100 further includes secondary legs 52 are arranged obliquely relative to the main axis X2. Like the primary legs 51, the secondary legs 52 each include an inner end 12 by which they are attached to the first member 31, and an outer end forming a secondary pad 131, which is in frictional contact with the inner wall 6 of the friction surface 131A. In the case of the secondary legs 52, the inner end is arranged downstream from the secondary pad 131 considering the direction D1, such that the secondary legs 52 have a reverse and symmetrical operation with respect to that of the primary legs 51. In the case at hand, when a third external force is applied opposing the first direction D1 on the first member 31, the secondary legs 52 rub or grip by mechanical camming against the inner wall 6 by their second pad 131, the tube 2 thus reacting at least a fraction of the third external force by rubbing or gripping of the secondary pad 131 of the secondary leg 52 against the inner wall 6. The legs 52 and the inner wall 6 can be designed such that:

under the application of the third external force, the legs 52 rub on the inner wall 6 without mechanically camming, and thus transmit only a fraction of the third external force E1 to the tube 2, and the remaining fraction of this external force to the second member 41, while allowing the movement of the members 31 and 41 in a direction opposite the direction D1, or alternatively, the legs 52 and the inner wall 6 are designed so that, under the application of force E1, the legs 51 grip by mechanical camming against the inner wall 6, such that any movement of the members 31 and 41 in the direction opposite the direction D1 is retained by the tube 2.

Ultimately, the device 100 is capable of distributing any axial external force applied on the first member 31, irrespective of the direction of this axial force, between the tube 2 and the second member 41, by rubbing, or gripping by mechanical camming, depending on the adopted design, either of the primary legs 51 or of the secondary legs 52 via their respective primary pad 13 and secondary pad 131. Thus, the device 100 automatically, mechanically and systematically protects the jack from the forces applied on the first member 31.

Of course, the second member 41 includes fingers 142 that each protrude from one of the radial arms 19 in a direction opposite that of the fingers 141. These fingers 142 form secondary elements driving the secondary pads 131, by bearing on the secondary legs 52, away from the inner wall 6 so as to reduce the friction of the secondary pads 131 on the inner wall 6, or even to cancel out description by completely unsticking the secondary pads 131. In the case at hand, it is under the application of a fourth external force on the second member 41 in a direction opposite the direction D1 that this situation occurs, inasmuch as the member 41 is then translated against the upstream stop 17. The fingers 142 are then made to bear against the secondary legs 52, such that the rubbing or mechanical camming of the latter is unprimed.

It will be understood that the secondary legs have a structure and a design that form a mirror image or substantially symmetrical image with respect to the primary legs, such that secondary legs symmetrical to the primary legs 5 shown in FIGS. 1 to 5 can be considered. Thus, by providing the first member 3 with a secondary flexible skirt formed by secondary legs and oriented symmetrically relative to the flexible skirt shown in FIGS. 1 to 5, one obtains an operation similar to the device 1 of FIGS. 1 to 4, or respectively of the device 200 FIG. 5 to that of the device 100 of FIG. 6.

Of course, it will be understood that the device 100 includes a plurality of radial arms 19, fingers 141, 142, upstream 17 and downstream 18 stops, primary legs 51, secondary legs 52, which are distributed around the main axis X2.

The invention claimed is:

1. A force-shunting device (1), comprising:
   a tube (2) that extends along a main axis (X2) and that has a substantially cylindrical inner friction wall (6);
   a first member (3) that is slidably mounted within the tube (2) along the main axis (X2);
   at least two primary legs (5) disposed obliquely relative to the main axis (X2), and each of said at least two primary legs including an inner end (12) attached to the first member (3), and each of the at least two primary legs (5) having an outer end forming a primary pad (13), which is in frictional contact with the inner wall (6), wherein each said inner end (12) is arranged upstream from each said primary pad (13) relative to a first direction parallel to the main axis (X2), such that, when a first external force (EI) is applied along the first direction on the first member (3) each of said at least two primary legs (5) rubs or grips by mechanical camming against the inner wall (6) via each said primary pad (13), the tube (2) thus reacting only a fractional force (F1) of the first external force (EI) by rubbing each said primary pad (13) against the inner wall, or all of the first external force (EI) by mechanical camming of the at least two primary legs (5);
   and a second member (4) that is mounted within the tube (2) and slidable along the main axis (X2), the second member drivingly connected to the first member (3), and the second member (4) is secured to at least one driving element, the driving element drives each said primary pad (13) so as to reduce the friction of the second member (4) on the inner wall (6), under the application of a second external force (E2) on the second member (4) along the first direction, to unprime the rubbing or mechanical camming of each of said at least two primary legs (5).

2. The device according to claim 1, wherein the driving element is designed to drive each said primary pad (13) away from the inner wall (6) when the second external force (E2) is applied on the second member (4).

3. The device according to claim 1, wherein the second member (4) forms a ring coaxial with the main axis (X2), the driving element forming a pad (14) that extends substantially parallel to the main axis (X2), the ring is attached to each of said at least two primary legs (5) via the driving element.

4. The device according to claim 1, wherein the driving element is designed to bear against each of the at least two primary legs (5) in the first direction.

5. The device according to claim 1, wherein the first member (3) forms a hollow cylinder that is coaxial with the main axis (X2), the second member (4) being translatable along the main axis (X2) within the tube (2), the second member (4) being provided with two stops defining a translational travel of the second member (4) relative to the tube (2), and via which the second member (4) can translate the first member (3) along the main axis (X2) relative to the tube (2).

6. The device according to claim 1, wherein each of the at least two primary legs (5) are metallic and elastically deformable and are mounted so as to be able to keep each said primary pad (13) in contact with the inner wall (6) by elasticity.

7. The device according to claim 1, wherein the inner end (12) of each of the at least two primary legs (5) comprises an elastic pivot link by which it is attached with the first member (3), around a pivot axis (X20) that is substantially orthoradial to the main axis (3), the elastic pivot link making it possible to keep each said primary pad (13) in contact with the inner wall (6) by elasticity.

8. The device according to claim 1, wherein the device comprises at least one secondary leg (52) arranged obliquely relative to the main axis (X2), the secondary leg (52) including an inner end (12) via which it is attached to the first member (31), and an outer end forming a secondary pad (131), which is in frictional contact with the inner wall (6), the inner end (12) of said at least one secondary leg being arranged downstream from the secondary pad (131) considering the first direction, such that, when a third external force is applied in opposition with the first direction on the first member (3), the at least one secondary leg (52) rubs or grips by mechanical camming against the inner wall (6) via the secondary pad (131), the tube thus reacting only a fraction of the third external force by rubbing of the secondary pad (131) of the at least one secondary leg (52) against the inner wall (6), or all of the third external force by mechanical camming of the at least one secondary leg (52); the second member (41) including a secondary driving element that is secured with the second member (4), to drive the secondary pad (131) so as to reduce the friction of the second member on the inner wall (6), under the application of a fourth external force on the second member (41) along a direction opposite the first direction, to unprime the rubbing or mechanical camming of the at least one secondary leg (52).

9. A mechanical actuator comprising:
a force-shunting device (1) according to claim 1; and
a jack coupled to the second member (4) so as to be able to drive the second member (4) along the main axis (X2) relative to the tube (2).

* * * * *